Feb. 19, 1946.   C. E. JORDAN   2,395,276
FUEL BURNER
Filed May 12, 1943   2 Sheets-Sheet 2

INVENTOR
CHARLES E. JORDAN
BY
Pennie, Davis, Marvin & Edmonds
ATTORNEYS

Patented Feb. 19, 1946

2,395,276

UNITED STATES PATENT OFFICE 2,395,276

FUEL BURNER

Charles E. Jordan, Whiting, Ind., assignor to Sinclair Refining Company, New York, N. Y., a corporation of Maine Application May 12, 1943, Serial No. 486,665

4 Claims. (Cl. 158—1)

This invention relates to fuel-fired furnaces and, more particularly, to fuel-fired furnaces of the radiant heat type such as extensively used, for instance, in the pyrolytic conversion of petroleum. The invention comprises an improved burner for use in such radiant heat furnaces adapted to withstand exposure to the intense radiant heat of the furnace atmosphere.

A desirable characteristic of burners used in furnaces of the radiant heat type is the provision of means for directing the flame at will to the various parts in the furnace and to vary the direction of the flame as required to maintain suitable temperatures and temperature gradients. Such burners are usually provided with a plurality of fuel injection nozzles at least some of which are adapted to change in direction so as to effect the desired distribution of flame throughout the furnace. In carrying out operations in which radiant heat furnaces are generally used, temperature gradients within the furnace are frequently of utmost importance and consequently it is highly desirable that the burner be adapted to an unusual nicety of adjustment.

For instance, in the pyrolytic conversion of petroleum, the petroleum oil to be treated is passed through long lengths of tubes arranged within a furnace adapted to heat the tubes and thus the oil flowing through the tubes. It has been found that the temperature gradient of the oil as it is passed through this heating zone is of critical importance with respect to the conversion. The optimum temperature gradient, however, depends upon the type of conversion to be effected and also varies markedly with different oils which are subjected to the same type of conversion. Accordingly, it is desirable that means be provided for varying and accurately maintaining in the furnace the temperature gradient best adapted to meet the requirements of particular operations.

Radiant heating is employed with advantage for various purposes, including pyrolytic conversion of petroleum, where uniform heating to relatively high temperatures is required. In the pyrolytic conversion of petroleum, it is particularly desirable because uniform heating of the surfaces of the heating tubes may be accomplished by so spacing the tubes with respect to themselves and with respect to the furnace walls that the radiant heat passing the fronts of the tubes is reflected from the furnace walls against the backs of the tubes.

The success of such radiant heating depends, of course, upon the maintenance of a highly luminous condition within the furnace, including the furnace atmosphere and furnace walls. Extreme care is required in the proper control of the amount and temperature of the air for combustion as well as in the mixing of the fuel and air so as to produce intense heat radiation.

These requirements have been met successfully but the maintenance of the burner has presented a unique and difficult problem because of the intense radiant heat characteristic of such furnaces to which the burner has heretofore been subjected.

Because of the unique requirements of burners used with such radiant heat furnaces, ordinary precautions for protecting the burner from the heat of the furnace are either inadequate or else are not applicable because of interference with the moving parts of the burner subjected to the intense radiant heat.

My invention will be particularly described and illustrated by an embodiment thereof in a burner particularly designed for use in a so-called downdraft radiant heat furnace of cylindrical shape. It will be understood, however, that the invention is applicable to radiant heat furnaces generally.

In a furnace of this type the burner is disposed on the top of the cylindrical furnace, extends through a burner port in the roof wall of the furnace, and directs the stream or streams of fuel downwardly into the furnace. The particular type of burner to which I shall refer in the illustration of my invention comprises an uppermost closure plate for covering the upper end of the burner port with a burner support plate suspended from the closure plate and separated a substantial distance therefrom. The resulting space between the two plates is surrounded by the walls of the burner port and provides a windbox wherein preheated combustion air is normally further preheated by the heat transmitted from the furnace through the burner support plate. The burner support plate is normally subjected to intense radiant heat from the furnace and usually becomes heated to a cherry red color as observed in daylight through lighting ports. Accordingly, special steel alloys have been required in construction of the burner support plate.

The burner is provided with means for burning either oil or gas, or both, concurrently. An oil burner nozzle projects through the center of the burner support plate into the interior of the furnace and a plurality of gas burner nozzles are arranged annularly in openings provided in the burner support plate. The gas burner nozzles comprise curved metal nozzle tubes of heat-resistant alloys seated in these openings with the curved portion of the tubes projecting into the interior of the furnace. The upper ends of the curved nozzle tubes open into the wind-box through adjustable dampers controlled from above the closure plate and the tubes are adapted to be lifted upwardly out of seated engagement with the burner support plate to admit additional preheated air to the furnace through resulting spaces around the tubes. Fuel gas is delivered into the interior of the curved nozzle tubes through supply pipes terminating therewithin. The curved nozzle tubes are so mounted in the burner support plate as to permit their rotation whereby the combustible mixture of fuel and air may be directed at will into any portion of the furnace to produce the desired temperature gradient.

The oil burner nozzle extends into the furnace through an opening in the central portion of the burner support plate of considerable larger diameter than that of the oil burner nozzle. Over the annular opening surrounding the oil burner nozzle, there is seated an adujstable damper plate supported by the burner support plate and adjustable by means of rods extending upwardly through the closure palte. This damper plate is adapted to be raised and to be tilted slightly so as to direct the oil flame.

In spite of meticulous care in the design of the curved nozzle tubes and other elements of the burner, proper operation of the burner under conditions such as to establish the desired temperature gradient throughout the furnace is hindered by the effect of the intense radiant heat from the furnace. The heat is such, for example, that, particularly when the furnace is operated at or near capacity, the burner support plate and the damper plate warp and crack with resulting alteration of the position and direction of the curved nozzle tubes and improper increase in the amount of air entering the furnace. Moreover, the high temperature to which the curved nozzle tubes are heated by the radiant heat, as well as the existing somewhat oxidizing conditions cause the curved nozzle tubes to be burned away with resulting adverse effect on their capacity to produce the desired type of radiant flame and properly to direct it. In addition to the adverse effect of these conditions on operation of the burner, extensive and expensive repairs are necessary involving the use of critical alloys for rebuilding, welding and replacement of damaged parts.

After considerable investigation I have devised a burner of the aforementioned type adapted to withstand exposure to the radiant heat of the furnace atmosphere. My improved burner, similar to that just described, comprises a metal burner support plate and a plurality of curved metal nozzle tubes supported by the burner support plate and projecting into the interior of the furnace. The curved tubes, which are adapted to discharge a combustible mixture of fuel and air for radiant heat combustion in the furnace and which are exposed to the radiant heat produced by combustion of this mixture, are provided with a layer of refractory material covering the outer surface of the curved portion of the tubes. The layer of refractory material covering the curved portion of the nozzle tubes is advantageously of tapered form with the thick end of the layer disposed adjacent the discharge end of each tube and with the thin end of the tapered layer terminating a substantial distance from the burner support plate. The burner support plate is also advantageously covered with a layer of refractory material disposed on the surface of the plate exposed to the furnace atmosphere. The resulting burner is thus protected against the deteriorating effects of the radiant heat atmosphere of the furnace and is capable of sustained operation wihout interference with the necessary movement of those elements of the burner for controlling the direction of the flames.

These and other features of the improved burner of the present invention will be further illustrated by reference to the accompanying drawings in which—

Figure 1:
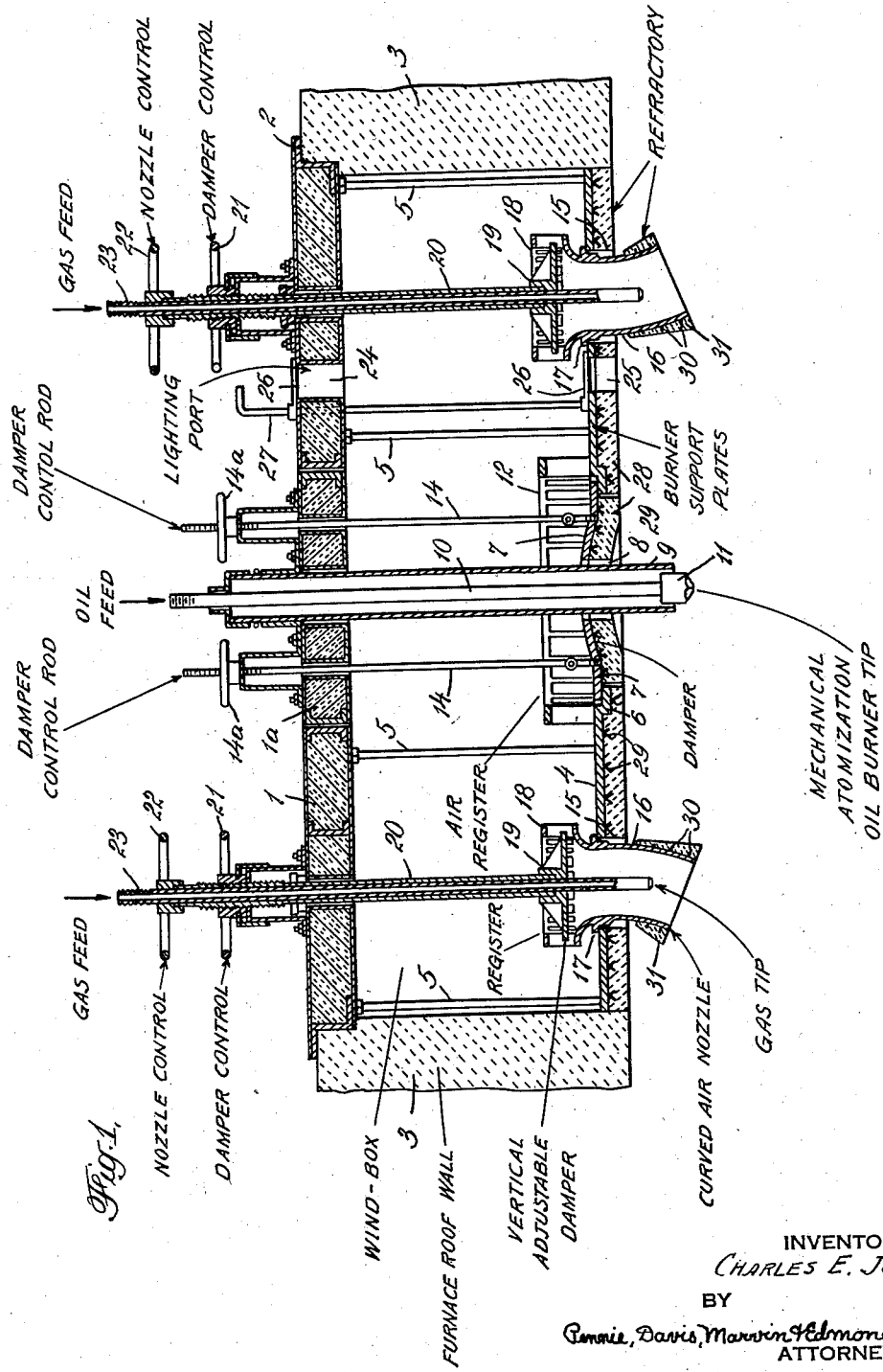
Fig. 1 is a side view in cross-section of the burner assembly showing a portion of the furnace roof wall.

The burner assembly, as more clearly shown in Fig. 1, comprises a circular end closure plate 1 composed of two metal sheets fastened together by angle irons with heat insulating material therebetween and having a central movable section 1a. The closure plate is provided circumferentially with a flange 2 adapted to engage the walls 3 of the burner port in the roof wall of the furnace. A burner support plate 4 is suspended a substantial distance below the end closure plate by stay rods 5 depending from the end closure plate. The end closure plate 1 and the burner support plate 4, together with the wall of the burner port, thus define a wind-box to which air for combustion is supplied in the conventional manner through a suitable duct not shown in the drawing.

Figure 2:
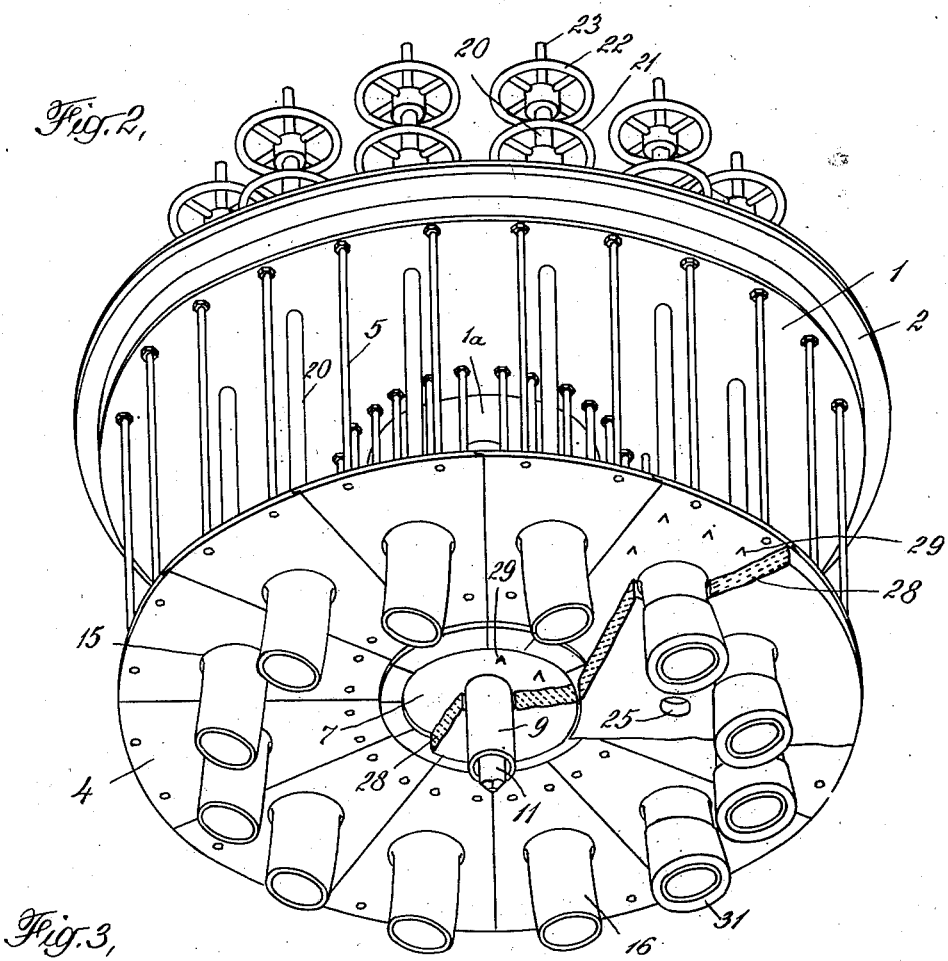
Fig. 2 is a perspective view of the burner showing, particularly, the curved nozzle tubes, burner support plate and central damper plate partly covered with refractory material.

The burner support plate 4 is preferably constructed of segment-shaped plate fitted together, advantageously with half lap scarf joints as shown in Fig. 2. In the central portion of the burner suport plate there is a circular opening provided interiorly with a downwardly displaced flange 6 on which is seated a master damper plate 7. The damper plate has a central opening 8 through which projects an oil burner sleeve 9 extending also through the movable portion 1a of the end closure plate 1. An oil feed tube 10 is positioned within the sleeve 9 and is provided at its lower end with a suitable burner tip 11. Air is admitted through the annular duct provided by the walls of the oil tube 10 and the sleeve 9. The opening 8 is made somewhat larger than the sleeve 9 so as to admit preheated air from the wind-box and to permit the damper plate 7 to be raised and tilted slightly to direct the oil flame within the furnace. The rate of admission of additional preheated air around the oil burner is controlled by an air register 12, supported by the burner support plate 4 and surrounding the central opening therein, cooperating with the damper plate 7 which is adapted to be raised by control rods 14 extending downwardly through the end closure plate 1a, attached at their lower ends to the damper plate 7 and operated by the hand wheels 14a.

The burner support plate 4 is also provided with a plurality of openings 15 advantageously arranged annularly at spaced intervals around the plate. A curved metal nozzle tube 16 having an outwardly extending flange 17 is positioned in each opening 15 with the flange 17 resting on the burner support plate. The curved portion of each tube projects through the opening 15 into the interior of the furnace. Each curved nozzle tube is thus adapted to be rotated through 360° so that the curved portion of the tube may be swung in any direction within the furnace without requiring any other change in position of the nozzle tube. The upper end of each nozzle tube is provided with a fixed, circular air register 18 and a vertically adjustable damper plate 19 is positioned within the fixed air register 18. A sleeve 20 secured to the damper plate 19 extends through the end closure plate 1 and is adapted to be raised or lowered by rotation of a hand wheel 21. As the damper 19 is raised until it touches the top of the fixed air register 18, further raising of the sleeve 20 raises the register 18 and thus lifts the flange 17 of the nozzle tube 16 out of seating engagement with the burner support plate to admit further quantities of preheated air into the furnace, thereby permitting a greater heat release in the furnace. The sleeve 20 is adapted to be rotated itself by another hand wheel 22, this rotation being imparted in turn to the damper 19 engaging the fixed air register 18 and thus effecting corresponding rotation of the curved nozzle tube 16. Gas is admitted to the interior of each curved nozzle tube through gas feed tubes 23 extending through the interior of the sleeve 20, for admixture with preheated air to produce a combustible mixture. Means are thus provided for delicately controlling the amount of air admitted to the furnace and for flexibly controlling the direction of the flame produced by burning of the combustible mixture discharged from each of the nozzle tubes.

Ignition of the fuel within the furnace is effected through lighting ports 24 and 25 provided in the end closure plate 1 and the burner support plate 4, respectively, the ports 24 and 25, respectively, being covered when not in use by the slides 26 mounted for rotation with a control rod 27.

The lower surfaces of the burner support plate 4 and the damper plate 7 are covered with a layer of refractory material 28, a plurality of angularly disposed projecting elements 29 being secured to the surfaces of these plates for securing the refractory material to the plates. Such projecting elements may with advantage comprise angles constructed of steel or alloy steel bars, say 1½ inches long, welded to the surfaces of the plates. A layer 28 of suitable refractory material, for example a refractory material sold under the trade-name "Plibrico," about two inches thick may then be applied over the projecting elements 29 to cover the lower surface of the burner support plate and of the damper plate 7. Openings are left in the refractory layer applied to the burner support plate corresponding to the openings 15 to the central opening covered by the damper plate 7, and the ignition port 25, and an opening is also left in the refractory covering of the damper plate 7 corresponding to its central opening 8.

Figure 3:
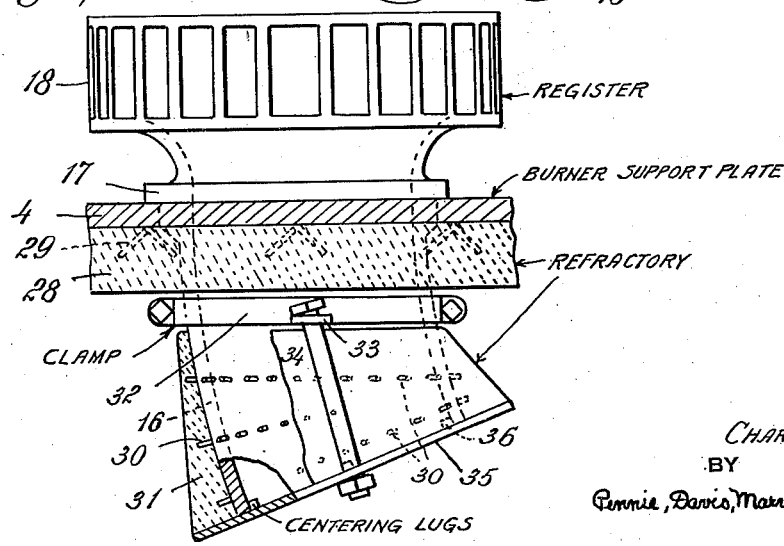
Fig. 3 is a side view of one of the curved nozzle tubes positioned in a fragmentary portion of the burner support plate and shows details of the application of the refractory material to the curved nozzle tubes and to the burner support plate.

A plurality of projecting elements 30, such as lugs of alloy steel about ⅜ inch long, are secured as by welding to the outer surface of the curved portion of the curved nozzle tubes 16. A layer 31, of suitable refractory material, such for example as the refractory material sold under the trade-name "Fireline," is then applied to the curved portion of the nozzle tube 16. This may be done as illustrated in Fig. 3 by fastening an annular clamp 32 about the central portion of the nozzle tube 16, the clamp having projecting lugs 33 through which bolts 34 may be fastened to hold a circular plate 35, of greater diameter than the tubes and provided with centering lugs 36, against the discharge end of the tubes. These circular plates may with advantage project outwardly beyond the perimeter of the nozzle exit a distance corresponding to the thickness of the refractory layer. The layer of refractory material is advantageously tapered and shaped to be about 1½ inches thick at the discharge end of the nozzle tubes and terminates short of surface of the layer 28 of refractory material on the burner support plate. Thus, the refractory material at the discharge ends of the nozzles may have a cross-sectional area greater than the cross-sectional area of the openings in the refractory material 28 through which the nozzles extend, and yet not interfere with rotative and limited longitudinal adjustment of the nozzles in said openings.

It will be seen that, by thus applying the refractory material, the nozzle tubes 16 may be rotated freely about their axes and may be lifted upwardly by raising the sleeve 20 without interference either from the refractory material covering the burner support plate or from the refractory material covering the nozzle tubes. The metal burner support plate and the curved nozzle tubes are thus protected from the deleterious effects of the radiant heat atmosphere of the furnace without impairing the delicacy of control of the burner required for maintenance of the desired flame structure within the furnace.

The tapered form of the refractory covering about the curved nozzle tubes makes possible the admission of "streamline" air around the nozzle tubes when these tubes are lifted off their seats, as herein described, for production of a flame of increased heating capacity. Without interference with the operation of the burner, the burner support plate, central damper plate and the nozzle tubes normally subjected to intense radiant heat are protected therefrom by the protective layer of refractory material covering these parts resulting in a very substantial decrease in maintenance and repair costs. The protection thus afforded the burner support plate, the central damper plate and the curved nozzle tubes makes it possible to use alloy steels for these parts containing less chromium and nickel than has been required heretofore, and, in fact, the use of steels containing neither of these critical metals is thereby made permissible.

I claim:

1. In a burner for use in a radiant heat furnace and adapted to withstand exposure to the radiant heat of the furnace, including a burner support plate adapted to fit into a burner port of the furnace and a plurality of curved metal nozzle tubes projecting through openings in the burner support plate, and into the furnace when the burner support plate is in position in the burner port, the nozzle tubes being adapted to discharge a combustible mixture of fuel and air for radiant heat combustion within the furnace; the improvement in which the burner support plate includes a refractory lining in thermally protecting contact with the combustion side of said plate, and having openings therein generally coinciding with the openings in said plate, through which the nozzle tubes project, and in which the nozzle tubes are circumferentially spaced from the openings in the burner support plate and refractory lining, and include a layer of refractory material covering the outer surface of their curved portions, the diameter of the openings in the refractory lining through which the nozzle tubes project being smaller than the maximum diameter of the tubes and refractory covering adjacent their discharge ends but the cross-sectional dimension of the tubes where they pass through the openings in the burner support plate and refractory lining, and for a distance therefrom in the direction of their discharge ends, being such as to permit said tubes to be rotated within and adjusted longitudinally of said openings.

2. In a burner for use in a radiant heat furnace and adapted to withstand exposure to the radiant heat of the furnace, including a burner support plate adapted to fit into a burner port of the furnace and a plurality of curved metal nozzle tubes projecting through openings in the burner support plate, and into the furnace when the burner support plate is in position in the burner port, the nozzle tubes being adapted to discharge a combustible mixture of fuel and air for radiant heat combustion within the furnace; the improvement in which the burner support plate includes a refractory lining in thermally protecting contact with the combustion side of said plate, and having openings therein generally coinciding with the openings in said plate, through which the nozzle tubes project, and in which the nozzle tubes are circumferentially spaced from the opening in the burner support plate and refractory lining, and include a layer of refractory material covering the outer surface of their curved portions, the diameter of the openings in the refractory lining through which the nozzle tubes project being smaller than the maximum diameter of the tube and refractory covering adjacent their discharge ends, the refractory material extending from the discharge end of said tubes but terminating a distance from said refractory lining so as not to interfere with rotative and longitudinal adjustment of the nozzle tubes within the openings in the burner support plate.

3. In a burner for use in a radiant heat furnace and adapted to withstand exposure to the radiant heat of the furnace, including a burner support plate adapted to fit into a burner port of the furnace and a plurality of curved metal nozzle tubes projecting through openings in the burner support plate, and into the furnace when the burner support plate is in position in the burner port, the nozzle tubes being adapted to discharge a combustible mixture of fuel and air for radiant heat combustion within the furnace; the improvement in which the burner support plate includes a refractory lining in thermally protecting contact with the combustion side of said plate, and having openings therein generally coinciding with the openings in said plate, through which the nozzle tubes project, and in which the nozzle tubes are circumferentially spaced from the openings in the burner support plate and refractory lining, and include a layer of refractory material covering the outer surface of their curved portions, the diameter of the opening in the refractory lining through which the nozzle tubes project being smaller than the maximum diameter of the tubes and refractory covering adjacent their discharge ends, the cross-sectional area of the tubes and refractory covering decreasing progressively from adjacent their discharge ends to a cross-sectional area at a plane short of the openings in the refractory lining which will permit rotative and longitudinal adjustment of the nozzle tubes within the openings in the burner plate.

4. In a burner for use in a radiant heat furnace and adapted to withstand exposure to the radiant heat of the furnace, including a burner support plate adapted to fit into a burner port of the furnace and a plurality of curved metal nozzle tubes projecting through openings in the burner support plate, and into the furnace when the burner support plate is in position in the burner port, the nozzle tubes being adapted to discharge a combustible mixture of fuel and air for radiant heat combustion within the furnace; the improvement in which the burner support plate includes a refractory lining in thermally protecting contact with the combustion side of said plate, and having openings therein generally coinciding with the openings in said plate, through which the nozzle tubes project, and in which the nozzle tubes are circumferentially spaced from the openings in the burner support plate and refractory lining, and include a layer of refractory material covering the outer surface of their curved portions, the diameter of the openings in the refractory lining through which the nozzle tubes project being smaller than the maximum diameter of the tubes and refractory covering adjacent their discharge ends, the refractory material extending from the discharge end of said tubes but terminating a distance from the refractory lining so as not to interfere with rotative and longitudinal adjustment of the nozzle tubes within the openings in the burner support plate, the refractory material extending longitudinally along the nozzle tubes progressively greater distances as their radius of curvature increases so that the refractory material terminates at all points around the nozzle tube at substantially the same distance from the refractory lining of the burner support plate.

CHARLES E. JORDAN.